United States Patent [19]

Braybrook

[11] 4,424,049
[45] Jan. 3, 1984

[54] POWER TRANSMISSION BELT WITH DRIVE BLOCKS

[75] Inventor: Kenneth A. Braybrook, Letchworth, England

[73] Assignee: Borg-Warner Corporation, Chicago, Ill.

[21] Appl. No.: 408,299

[22] Filed: Aug. 16, 1982

Related U.S. Application Data

[63] Continuation of Ser. No. 167,261, Jul. 9, 1980, abandoned.

[51] Int. Cl.³ .................. F16G 51/80; F16G 1/00; F16G 5/00
[52] U.S. Cl. .................. 474/201; 474/242; 474/272
[58] Field of Search .............. 474/201, 240, 242, 244, 474/272

[56] References Cited

U.S. PATENT DOCUMENTS

| | | | |
|---|---|---|---|
| 2,038,583 | 4/1936 | Maurer | 474/201 |
| 2,322,466 | 6/1943 | Perry | 474/242 |
| 2,475,264 | 7/1949 | Sutton | 474/245 |
| 3,720,113 | 3/1973 | Van Doorne et al. | 474/242 |
| 3,949,621 | 4/1976 | Beusinki et al. | 474/201 |
| 4,080,841 | 3/1978 | Vollers | 474/201 |
| 4,177,687 | 12/1979 | Russ, Sr. | 474/242 |
| 4,193,312 | 3/1980 | Cicognani | 474/242 |
| 4,342,561 | 8/1982 | Braybrook | 474/242 |

FOREIGN PATENT DOCUMENTS

| | | | |
|---|---|---|---|
| 802 | 2/1979 | European Pat. Off. | |
| 26534 | 4/1981 | European Pat. Off. | |
| 2414891 | 3/1974 | Fed. Rep. of Germany | 474/201 |
| 2414989 | 10/1975 | Fed. Rep. of Germany | 474/201 |
| 1066329 | 1/1954 | France | 474/201 |
| 7900923 | 8/1980 | Netherlands | 474/272 |
| 256918 | 9/1948 | Switzerland | 474/201 |

*Primary Examiner*—Lawrence J. Staab
*Assistant Examiner*—Michael D. Bednarek
*Attorney, Agent, or Firm*—Aubrey L. Burgess

[57] ABSTRACT

A power transmission belt especially adapted for use in variable pulley transmissions and comprising a continuous metal containing band with attached drive blocks. The drive blocks are formed from sheet metal stampings and formed by sheet metal bending procedures.

2 Claims, 4 Drawing Figures

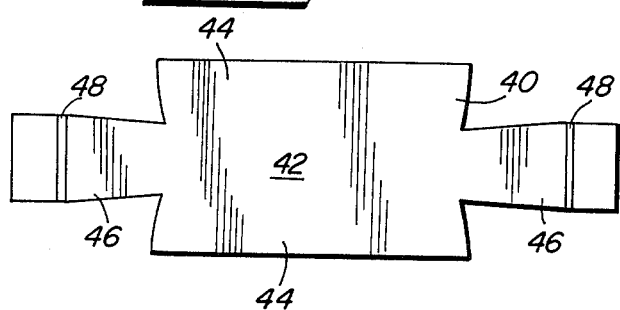
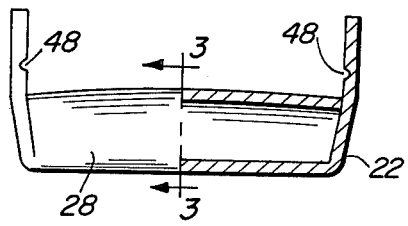
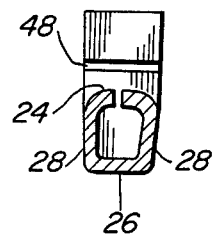
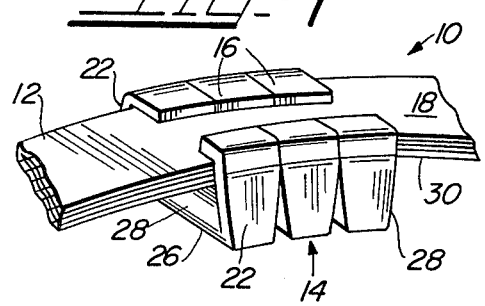

POWER TRANSMISSION BELT WITH DRIVE BLOCKS

This is a continuation of application Ser. No. 167,261 filed July 9, 1980 now abandoned.

BACKGROUND OF THE INVENTION

Flexible power transmission belts comprising an assembly of a plurality of superimposed steel strips and a plurality of V-shaped solid metal blocks are well known in the art. An example of such a construction is disclosed in U.S. Pat. No. 3,720,113 granted Mar. 13, 1973 to H. J. Van Doorne et al. In the patented structure, the blocks are provided with lateral guides having relatively short top edges which overlie the steel strips to maintain the parts in assembled relationship. The precise method used to assemble the blocks on the steel strip is not disclosed.

Another example of a flexible power transmission belt is described in U.S. Pat. No. 3,949,621 granted Apr. 13, 1976 to Beusink, deceased, et al in which solid metal plates are mounted on metal strips, the strips being received in slots in the lateral edges of the plates.

Other flexible power transmission belts comprising an assembly of links, pins and pulley contact members are described in U.S. Pat. Nos. 2,038,583, granted Apr. 28, 1936 to Maurer and 2,475,264, granted July 5, 1949 to Sutton.

THE INVENTION

The invention to be described relates to a method for making a flexible power transmission belt and to the belt so made. The belt comprises a continuous metal band with metal drive blocks attached thereto, the drive blocks having angled sides to engage the flanges of drive and driven pulleys. Such a belt is especially adapted for use in variable pulley transmissions.

In the belt of this invention, each block is formed of sheet metal from a blank. Generally cross-shaped blanks are stamped from sheet metal, the blanks each having a central body portion, extending side portions and extending end portions. The side portions are folded by sheet metal working techniques to form a hollow central member and the end portions are bent to close the hollow ends of the central member and extend upwardly of the top thereof. The extending portions of the end members are bent over the metal band. These steps are repeated for each drive block, which are adjacent to one another over the length of the band. The front and backs of each drive block are tapered to permit articulation of the assembly; the angled end surfaces can be roughened or otherwise treated to enhance friction contact with pulley flanges. Also, the blocks can be hardened after most of the forming steps but before the end portions are bent over the band. To facilitate the bending, a narrow strip on each end portion is softened after the general hardening steps.

The belts manufactured according to this invention are relatively inexpensive and lighter in weight than solid blocks.

THE DRAWING

FIG. 1 is a partial perspective view of a belt according to this invention;

FIG. 2 is a plan view of a stamped sheet metal blank from which a drive block is formed;

FIG. 3 is a side view of a partially completed drive block; and

FIG. 4 is a sectional view of line 4—4 of FIG. 3.

DETAILED DESCRIPTION

Attention is invited to FIG. 1 of the drawing which illustrates a portion of a power transmission belt 10 comprising a metal band 12 and a plurality of side-by-side drive blocks 14. The metal band 12 is preferably a plurality of relatively thin strips connected together; it could be a solid metal strip or a single metal strip wound to have multiple layers. Each of the drive blocks 14 are connected to the band 12 by ears 16 which partly traverse the upper surface 18 of the band 12. A hollow body portion 20 of the drive blocks comprises ends 22 which are tapered to contact the flanges of a pulley and upper, lower and side parts 24, 26 and 28, respectively (see also FIGS. 3 and 4). The upper part 24 is located adjacent to the lower surface 30 of the band 12 while the side parts 28 taper in such a manner to permit articulation of the belt 10. In that the drive blocks are hollow and made from sheet metal by stamping and forming tecnhiques, they are relatively light and inexpensive to manufacture.

To manufacture the drive blocks 14, as illustrated in FIG. 2, blanks 40 are stamped from sheet metal. Each blank 40 is generally cross-shaped having a central body portion 42, side portions 44 and end portions 46. Preferably, grooves or notches 48 are formed in the end portions to facilitate the bending thereof over the band 12.

The side portions 44 and end portions 46 are bent by conventional metal working techniques to form the intermediate formed blocks as illustrated in FIGS. 3 and 4. The faces 22 of the end portions can be ground or roughened to enhance frictional contact with the pulleys of the drive system, and the intermediate formed blocks are then hardened in a conventional manner. To facilitate bending the end portions over the band 12, the area around the grooves or notches are softened, also in a conventional manner. After the area is softened, the end portions are bent over the band 12 to form the ears 16 as previously described.

I claim:

1. A power transmission drive belt especially adapted for use in a pulley transmission in which the pulleys are each constructed of a pair of flanges, said belt comprising at least one continuous metal band having inner and outer surfaces and a plurality of drive blocks in a continuous array along and connected to said metal band, each drive block having opposed end surfaces for drivingly engaging the pulley flanges.

each drive block having a hollow body elongated in the transverse direction of said band with front and rear sides, ends adapted to drivingly engage the pulley flanges, a top and a bottom, the top of each block body being in contact with said inner surface of the band and the bottom of each block body being free of contact with said band, and integral tab-like ear members overlying the outer surface of the band and forming the connection of each block and the band.

2. A power transmission belt as recited in claim 1, wherein said tab-like ear members are extensions of said ends.

* * * * *